Figures 4, 5:
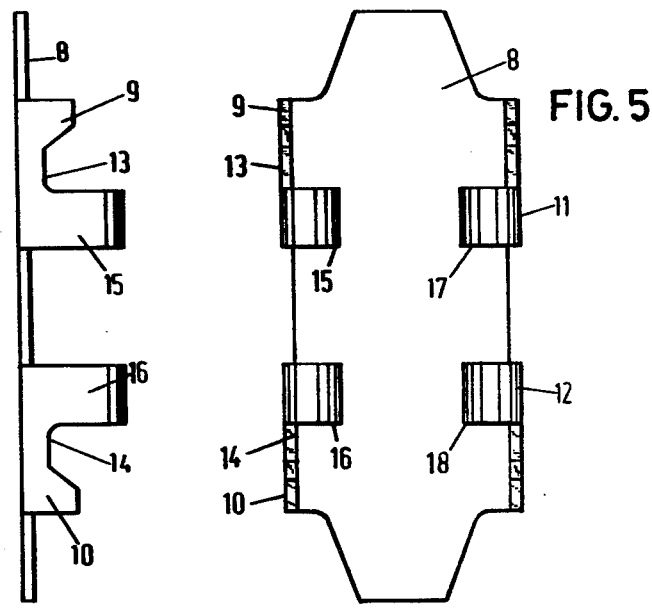

United States Patent [19]

Scholtus

[11] 4,010,796
[45] Mar. 8, 1977

[54] LATTICE, COMPOSED OF STRIPS WITH CONNECTING BRACKETS POSITIONED IN BETWEEN

[75] Inventor: Christiaan Gustaaf Adolf Scholtus, Alkmaar, Netherlands

[73] Assignee: Reactor Centrum Nederland, The Hague, Netherlands

[22] Filed: Nov. 1, 1974

[21] Appl. No.: 520,226

Related U.S. Application Data

[63] Continuation of Ser. No. 307,215, Nov. 16, 1972, abandoned.

[30] Foreign Application Priority Data

Nov. 26, 1971 Netherlands ............... 7116242

[52] U.S. Cl. .................... 165/69; 165/162
[51] Int. Cl.[2] ............................ F28F 7/00
[58] Field of Search .......... 219/107, 108; 165/162; 29/157.3, 157.3 A, 157.3 B, 157.3 D, 157.4; 228/110, 115

[56] References Cited

UNITED STATES PATENTS

| | | | |
|---|---|---|---|
| 2,261,136 | 11/1941 | Frisch et al. | 219/107 X |
| 2,737,370 | 3/1956 | Brown, Jr. | 29/157.3 A X |
| 3,646,994 | 3/1972 | Piepers et al. | 165/162 |
| 3,893,223 | 7/1975 | Mimj | 228/110 |

Primary Examiner—C. J. Husar
Assistant Examiner—Theophil W. Streule, Jr.
Attorney, Agent, or Firm—Cushman, Darby & Cushman

[57] ABSTRACT

Lattice for the giving of sideways support to fissile rods as used in a nuclear reactor, or other rods or pipes, likewise subjected to heat exchanging conditions, as for example in a heat exchanger. The lattice is composed of elongated metal strips, connected at intervals by transversely poised brackets, consisting of narrow strips, of which the connecting edges are bended into lips, set at an angle, to be fixed at the elongated strips.

1 Claim, 10 Drawing Figures

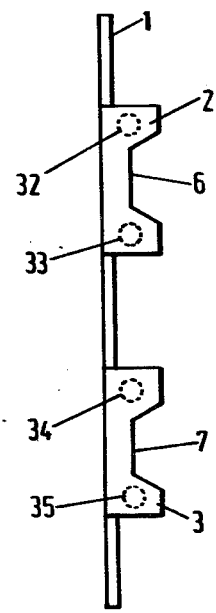
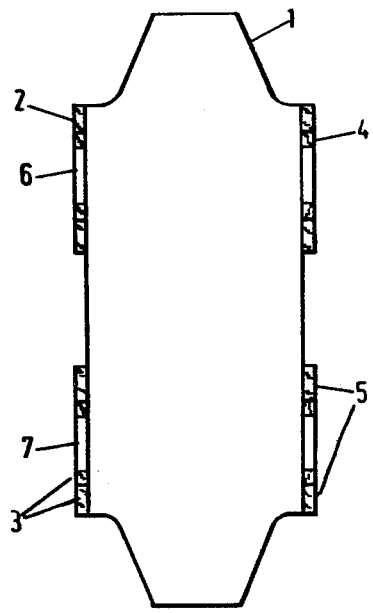
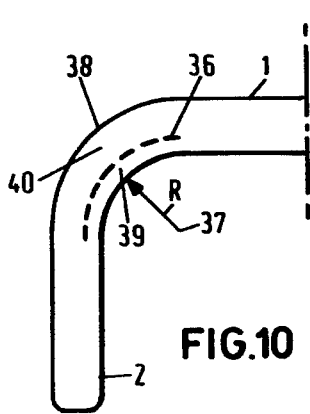
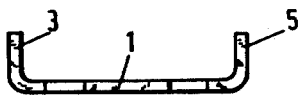

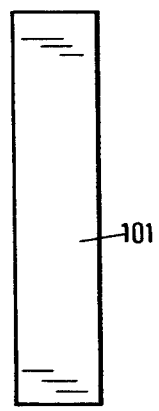
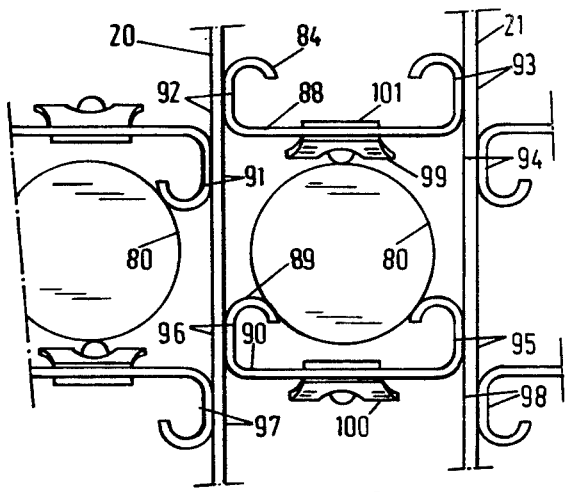
FIG.7  FIG.8
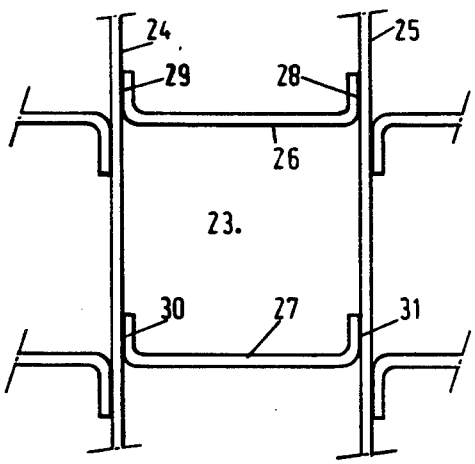
FIG.9

LATTICE, COMPOSED OF STRIPS WITH CONNECTING BRACKETS POSITIONED IN BETWEEN

This is a continuation of application Ser. No. 307,215, filed Nov. 16, 1972, now abandoned.

The invention relates to a lattice composed of strips positioned parallel to each other with connecting brackets fitted in between, each of the said connecting brackets being fixed to the said strips by means of lips which are bent over on the longitudinal sides of a brackets.

Lattices of this kind are known per se. They show, however, the drawback that after being put together they may undergo a change of shape, especially if the components are fixed to each other by means of spot welds. This is due to warping of the brackets after welding.

According to the invention this change of shape is obviated in that on each longitudinal side of a brackets the lip shows a break in at least one place, which break continues up to the flat of the brackets, with a lip portion on either side of the latter.

The invention relates more particularly to a lattice that is intended to be used as a supporting lattice serving to lend support to a plurality of elongated fixed elements engaging in a heat-exchange process, these elements being supported by spacers executed in a resilient form of construction on at least one side of an element, in compartments formed by said strips and brackets. According to a special embodiment the ends of the lips are executed in the form of spacers. Thanks to this feature the strips need not be weakened because of spacers having to be stamped out of these strips. This measure thus makes for increased strength of the lattice.

According to a further improvement it is provided that a lip portion has in its middle part a notch which is continued over part of the height of the lip. This measure, too, ensures that the brackets remain straight after the welding process, as does also the measure whereby, in a row of successive shackles, the lips are directed alternately one way and then the other way. It is further conducive to greater rigidity of the lattices if the flat faces of the brackets are positioned in each other's extension.

Figure 6:
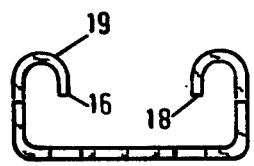

A few embodiments of the invention will now be elucidated by reference to the undermentioned figures:

FIG. 1: a side view of a shackle;
FIG. 2: a front view of the brackets according to FIG. 1;
FIG. 3: a bottom view of the brackets depicted in FIG. 1;
FIG. 4: a side view of a variant of the brackets of FIG. 1;
FIG. 5: a front view of the brackets depicted in FIG. 4;
FIG. 6: a bottom view of the brackets of FIG. 4;
FIG. 7: a strip of sheet material used as back plate for a spring
FIG. 8: a top plan view of a lattice serving as support for fissile rods, the spacers being at the same time lips of the bridge pieces;
FIG. 9: an alternative lattice structure, using the bridge pieces depicted in FIGS. 1, 2 and 3;
FIG. 10: a detail of a bent-over lip.

Numeral 1 in FIG. 1 denotes a brackets provided on either side with lip portions, numbered respectively as 2 and 3 and as 4 and 5. Each lip portion has a notch 6 and 7 respectively. FIGS. 2 and 3 give a front view and a bottom view of the same shackle.

FIG. 5 gives a front view of a variant of FIG. 2. In this case the shackle is provided with lip portions denoted by the numerals 9, 10 and 11, 12 respectively. Here again notches are provided which are denoted by the numerals 13 and 14. A part of each lip portion is executed in the form of a spacer, 15 and 16 on one side of the brackets and 17 and 18 on the other side. The bottom view depicted in FIG. 6 shows clearly that the spacers 16 and 18 are provided, this in such a way that a fissile element is supported by the round part 19 of each spacer.

FIG. 8 gives a top plan view of a lattice in which the brackets illustrated in FIGS. 4, 5 and 6 are used. These brackets are now denoted by the numerals 88 and 90. The lattice, whose structure is formed with the aid of parallel strips 20 and 21, is held together by means of spot welds which have been made at the positions 92, 93, 94, 95 and 96.

Fissile rods 80 are supported in each compartment of the lattice on the one hand by the round parts of spacers 89 and on the other hand by a plate spring 99. This plate spring is fixed by means of a back plate 101 (see FIG. 7) against lattice 88, likewise by means of spot welds.

FIG. 9 gives a top plan view of a lattice 23 which is composed of strips 24 and 25 and between which the brackets 26 and 27 are placed. These shackles are of the type illustrated in FIGS. 1, 2 and 3. A plurality of spot welds have been made at the positions numbered 28, 29, 30 and 31 and, as regards the lip portions, at the positions which in FIG. 1 are indicated respectively as 32, 33 and as 34, 35.

Finally, in FIG. 10 it is made clear by reference to a detail of a bent-over lip how it is that a shackle becomes bent if the measure proposed in the present patent application is not put into effect. The lip portion 2 which has bent over from the flat portion 1 of the shackle, its radius of curvature being R, has a neutral layer which is designated as 36. In practice this neutral layer is found to be nearer to the mid point 37 of radius R than to the outer side 38 of lip 2. The distance 39 and 40 are in fact in the ratio of 1 : 2. The result of this is that in area 40 the tensile stresses due to bending-round predominate over the compressive stresses existing in area 39. This disparity in the distribution of stress will cause the brackets to warp unless breaks are suitably provided in the lips as set forth in the foregoing.

It is furthermore observed that the provision of a notch in portions of the lips, as illustrated in FIGS. 1 and 2 by the parts 2, 3, 4 and 5, also has the result that the contact surface between these lip portions and the brackets strips (as with 20, 21, 24 and 25) becomes smaller. The chance that matter (so-called "curd") may accumulate at this contact surface is in this way also diminished.

I claim:

1. A lattice spacer structure for supporting cylindrical heat exchanging elements, said structure comprising: a plurality of elongated parallel flat strips positioned lengthwise and interconnected with brackets thereby forming a plurality of compartments, each of said compartments being defined by a pair of said strips and a pair of said brackets, each of said brackets including a body portion extending the width between said strips having separate bent lip portions on both sides, each lip portion being fastened to one of said strips by spot welds which are spaced-apart along a line parallel to the axis of the compartment and each lip portion having a notch between every two spot welds and an integral curved spacer, said spacers being positioned on one of said brackets to support said cylindrical heat exchanging elements within one of said compartments, and said cylindrical elements also being secured to a second bracket by a plate spring fastened to the back of each of said brackets.

* * * * *